(12) United States Patent
Purvis

(10) Patent No.: US 7,050,684 B2
(45) Date of Patent: May 23, 2006

(54) COMPOSITION COMPRISING FLUORINATED, RADIATION-CURABLE DYES FOR SURFACE ENERGY CONTROL

(75) Inventor: Michael B. Purvis, Hickory, NC (US)

(73) Assignee: Alcatel, Paris (FR)

(*) Notice: Subject to any disclaimer, the term of this patent is extended or adjusted under 35 U.S.C. 154(b) by 6 days.

(21) Appl. No.: 11/008,287

(22) Filed: Dec. 10, 2004

(65) Prior Publication Data
US 2005/0154078 A1 Jul. 14, 2005

Related U.S. Application Data

(62) Division of application No. 10/154,921, filed on May 28, 2002, now Pat. No. 6,844,373.

(51) Int. Cl.
*G02B 6/02* (2006.01)
*G02B 6/04* (2006.01)
*G02B 6/036* (2006.01)
*G02B 6/44* (2006.01)

(52) U.S. Cl. ............... 385/100; 385/115; 385/123; 385/128; 358/901.1; 359/896

(58) Field of Classification Search ........... 385/100, 385/115, 123, 128; 358/901.1; 359/896
See application file for complete search history.

(56) References Cited

U.S. PATENT DOCUMENTS

| | | | |
|---|---|---|---|
| 3,717,491 A | 2/1973 | Uffner | |
| 5,442,045 A | 8/1995 | Haugland et al. | |
| 5,530,053 A | 6/1996 | Rao et al. | |
| 5,541,235 A | 7/1996 | Busman et al. | |
| 5,729,641 A | 3/1998 | Chandonnet et al. | |
| 6,133,472 A | 10/2000 | Nalewajek et al. | |
| 6,221,987 B1 | 4/2001 | Sugiyama | |
| 6,229,055 B1 | 5/2001 | Klaubert et al. | |
| 6,844,373 B1 * | 1/2005 | Purvis ............... | 522/26 |
| 2002/0057881 A1 | 5/2002 | Greer, IV | |

FOREIGN PATENT DOCUMENTS

| | | |
|---|---|---|
| EP | 0 323 060 A2 | 7/1989 |
| EP | 1 291 373 A2 | 3/2003 |
| WO | WO 02/098945 A1 | 12/2002 |

* cited by examiner

*Primary Examiner*—Nathan M. Nutter
(74) *Attorney, Agent, or Firm*—Sughrue Mion, PLLC

(57) ABSTRACT

A radiation-curable composition having a reduced surface energy and including a reactive dye containing at least one radiation-curable substituent and at least one fluorine-containing substituent. The reactive dye may include any anthraquinone, methine, azo, azine, or xanthene dye adapted to contain at least one radiation-curable substituent and at least one fluorine-containing substituent. The radiation-curable substituent may include (meth)acrylate, styrene, vinyl ether, vinyl ester, N-substituted acrylamide, N-vinyl amide, maleate ester, and fumarate ester.

6 Claims, No Drawings

COMPOSITION COMPRISING FLUORINATED, RADIATION-CURABLE DYES FOR SURFACE ENERGY CONTROL

CROSS-REFERENCE TO RELATED APPLICATION

This is a divisional of application Ser. No. 10/154,921 filed May 28, 2002, and now U.S. Pat. No. 6,844,373, the disclosure of which is hereby incorporated by reference.

FIELD OF THE INVENTION

The present invention relates to a radiation-curable composition having a reduced surface energy. In particular, the composition comprises a reactive dye comprising at least one radiation-curable substituent and at least one fluorine-containing substituent. The composition is adaptable for a variety of uses, including, for example, as a colored coating for optical fiber, as well as a coating, ink or colorant package in the printing and inking industries.

BACKGROUND OF THE INVENTION

Compositions containing fluorinated chemical compounds are known in the art.

For example, U.S. Pat. No. 5,567,794 to Barraud, et al. discloses a fluorinated acrylate type polymeric material for coating optical fibers based on at least one diol, a diisocyanate, and an acrylate, wherein at least one of the diol, diisocyanate, and acrylate contains fluorine and at least one of the diol, diisocyanate, and acrylate contains sulfur. The '794 patent, however, does not disclose or suggest a composition comprising a reactive dye comprising at least one radiation-curable substituent and at least one fluorine-containing substituent.

U.S. Pat. No. 5,541,235 to Busman, et al. relates to a cationic dye compound and a method for increasing its solubility in organic solvents by associating it with fluorinated alkylsulfonyl anions. The '235 patent does not disclose or suggest a reactive dye comprising at least one radiation-curable substituent and at least one fluorine-containing substituent.

U.S. Pat. No. 6,133,472 to Nalewajek, et al. relates to fluorinated vinyl ethers and, more particularly, to fluorinated compounds containing one or more oxyvinyl groups. The '472 patent does not disclose or suggest a composition comprising a reactive dye comprising at least one radiation-curable substituent and at least one fluorine-containing substituent.

Indeed, some fluorinated dyes are known to be useful in biological applications in which a highly sensitive detection reagent is desirable. For example, U.S. Pat. No. 6,229,055 to Klaubert, et al. discloses fluorinated xanthene dyes and dye-conjugates suitable for use as tracers, labels, or synthetic intermediates. The '055 patent, however, does not disclose or suggest a radiation-curable composition comprising a reactive dye comprising a radiation-curable substituent and a fluorine-containing substituent.

SUMMARY OF THE INVENTION

The present invention provides a radiation-curable composition comprising a reactive dye comprising at least one radiation-curable substituent and at least one fluorine-containing substituent. The radiation-curable composition has a reduced surface energy. The radiation-curable composition may be adapted to serve a variety of purposes. For example, the composition may be formulated to serve as a protective, colored coating for substrates manufactured from a wide variety of materials, including, for example, glass, plastic, ceramic, metal and wood.

DETAILED DESCRIPTION OF THE INVENTION

The radiation-curable composition of the present invention is not particularly limited by how it is prepared. Any conventional process and equipment suitable for this purpose may be employed. Blends of oligomers, monomer diluents, and other ingredients in the art of radiation-curable compositions may also be included within the composition to tailor the composition's properties.

A characteristic feature of the present composition is its reduced surface energy. For example, when the composition is adapted for use as a coating, the reactive dye of the composition orients itself to the upper microns of the coating surface, thereby concentrating the dye in the outer area of the coating. The result is a coating that exhibits a reduced surface energy without the addition of a release agent or surface agent. In addition, the concentration of dye at the outer surface of the coating results in a reduced amount of dye that is needed to color a substrate. Finally, coating the present composition onto the surface of a substrate yields a coated surface that is water repellent, easy to clean, and relatively releasable. For example, an optical fiber coated with the composition spools easier.

The radiation-curable composition is now described in more detail.

The radiation-curable composition comprises a reactive dye comprising at least one radiation-curable substituent and at least one fluorine-containing substituent. The reactive dye of the composition may be any chromophore-containing compound that also contains at least one radiation-curable group, e.g., a radiation-curable substituent, and fluorine, e.g., a fluorine-containing substituent. For example, the reactive dye of the composition may be a radiation-curable-group-substituted, fluorine-substituted derivative of an anthraquinone dye, a methine dye, an azo dye, an azine dye, or a xanthene dye.

The reactive dye of the composition is not limited by molecular weight. For example, a starting material for producing the reactive dye of the composition may be any of the so-called oligomeric dyes, provided that it may be adapted to contain fluorine and at least one radiation-curable group, e.g., ethylenic unsaturation, such as acrylate. Alternatively, the starting material for producing the reactive dye of the composition may be any of the so-called monomeric dyes, provided that it too may be adapted to contain fluorine and at least one radiation-curable group, e.g., ethylenic unsaturation, such as acrylate.

In certain embodiments, the at least one radiation-curable substituent will be separate and apart from the at least one fluorine-containing substituent. Thus, in certain embodiments, the chromophore-containing compound will have a total of at least two substituents, one substituent being a radiation-curable substituent and the other substituent being a fluorine-containing substituent. The fluorine-containing substituent may simply be fluorine or it may be any substituent comprising fluorine.

In other embodiments, the chromophore-containing compound may have one or more substituents, but at least one substituent will contain both fluorine and a radiation-curable moiety.

The chemical nature of a radiation-curable compound that may be reacted to provide a radiation-curable substituent on the reactive dye of the invention is not narrowly limited, provided that it contains a functional component that can be reacted to provide the dye with the radiation-curable substituent.

Isocyanate chemistry is a general example of a method for providing a dye of this invention with a radiation-curable substituent. By reacting an isocyanate-reactive dye and an isocyanate-reactive radiation-curable compound with a diisocyanate, for example, a radiation-curable-group-containing dye can be formed. Alternatively, an isocyanate-reactive dye may be reacted with an isocyanate, including a monoisocyanate, containing radiation-curable functionality, e.g., ethylenic unsaturation, such as an acrylate group, in order to form the radiation-curable-group-containing dye. While further detail will be provided below for arriving at a dye according to this invention via isocyanate chemistry, it will be readily understood by one of ordinary skill in the art that a dye according to the invention may be prepared by any and all reaction chemistries that lead to a radiation-curable-group-containing, fluorine-containing dye.

An example of an isocyanate-reactive dye is a chromophore-containing compound having one or more hydroxy substituents. Suitable chromophore-containing compounds having one or more hydroxy substituents are marketed under the trademark REACTINT™ by the Milliken Chemical Company. Alternatively, the isocyanate-reactive dye may be any chromophore-containing compound having one or more thiol or amino substituents.

Examples of suitable diisocyanates include 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate or IPDI), 4,4'-methylenebis(cyclohexyl isocyanate) ($H_{12}$MDI or DESMODUR W), methyl-2,4-cyclohexane diisocyanate, methyl-2,6-cyclohexane diisocyanate, and 1,3- or 1,4-bis(isocyanatemethyl)cyclohexane.

The radiation-curable compound may be any hydroxy-, thiol-, or amino-functionalized, i.e. any isocyanate-reactive, compound capable of polymerizing under the influence of, for example, ultraviolet radiation.

One type of radiation-curable functionality is, for example, ethylenic unsaturation, which in general is polymerized through radical polymerization, but can also be polymerized through cationic polymerization. Groups containing (meth)acrylate, styrene, vinylether, vinyl ester, N-substituted acrylamide, N-vinyl amide, maleate ester, and fumarate ester moieties are examples of a suitable radiation-curable compound.

Preferred isocyanate-reactive radiation-curable compounds that react to provide the radiation-curable substituent are hydroxy-functional (meth)acrylates. Examples of hydroxy-functional (meth)acrylates include 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth)acrylate, 2-hydroxy-3-phenyloxypropyl (meth)acrylate, 2-hydroxyalkyl(meth)acryloyl phosphate, 4-hydroxycyclohexyl (meth)acrylate, cyclohexanedimethanol mono(meth)acrylate, neopentyl glycol mono (meth)acrylate, trimethylolpropane di(meth)acrylate, and pentaerythritol tri(meth)acrylate.

Another type of radiation-curable functionality is provided by, for example, epoxy groups, or thiol-ene or amine-ene systems. Epoxy groups, in general, can be polymerized through cationic polymerization, whereas the thiol-ene and amine-ene systems are usually polymerized through radical polymerization. The epoxy groups may be, for example, homopolymerized. In the thiol-ene and amine-ene systems, for example, polymerization may occur between a group containing allylic unsaturation and a group containing a tertiary amine or thiol.

For embodiments wherein the chromophore-containing compound has one substituent that contains both fluorine and a radiation-curable moiety, the radiation-curable compound that reacts to provide a radiation-curable substituent on the reactive dye of the invention is a fluorinated radiation-curable compound. Fluorinated radiation-curable compounds that may be reacted to provide a fluorinated, radiation-curable substituent on a chromophore-containing compound may be purchased from Fluorochem, USA, and include compounds such as: 3-(perfluorobutyl)-2-hydroxy propylacrylate; 3-(perfluoro-n-hexyl)propyl-2-ene-1-ol; 3-(perfluoro-7-methyloctyl) 2-hydroxypropylmethylacrylate; 3-(perfluorooctyl)-2-hydroxypropyl acrylate; 2,3,4 trifluorocinnamic acid; and 4,4,4-trifluorocrotonic acid. Of course, the foregoing list is not exclusive, and one skilled in the art may envision a number of structures containing both fluorine and radiation-curable, e.g., uv-curable, functionality.

Prior to being substituted with a radiation-curable substituent, regardless of whether the radiation-curable substituent is itself fluorinated, the reactive dye of the composition may be fluorinated by any method known in the art. Alternatively, the reactive dye may be fluorinated by any method known in the art after it has been substituted with a radiation-curable substituent, again regardless of whether the radiation-curable substituent is itself fluorinated.

As mentioned earlier, fluorinated dyes are known, and any method of fluorination may be employed, including the method described in U.S. Pat. No. 6,229,055 to Klaubert, et al., which is incorporated herein in its entirety. Examples of fluorinated dyes that, when provided with a radiation-curable group, may be suitable for use in the present invention, include dyes produced by BASF, Ciba Specialty Chemicals, ICI, and Bayer. They may be found under the trade names PROCION MX, BASILEN M, CIBACRON, CIBACRON E, LEVAFIX E-N, and DRIMAREN K.

The radiation-curable composition may also comprise a radiation-curable oligomer, for example, a urethane (meth) acrylate oligomer. The oligomer may be synthesized by methods known in the art or purchased commercially. A suitable method of synthesizing a radiation-curable oligomer for use in the present composition is set forth in U.S. Pat. No. 6,323,255, which is incorporated herein in its entirety.

The radiation-curable composition may also comprise a photoinitiator, such as, for example, a free radical photoinitiator. Suitable free radical-type photoinitiators include, for example, an acyl phosphine oxide photoinitiator, more specifically, a benzoyl diaryl phosphine oxide photoinitiator. Examples of suitable benzoyl diaryl phosphine oxide photoinitiators include: bis(2,4,6-trimethylbenzoyl)phenylphosphine oxide (Irgacure 819 available from Ciba Additives), (2,4,6-trimethylbenzoyl)diphenylphosphine oxide (Lucerin TPO available from BASF of Parsippony, N.J.); bis(2,6-dimethoxybenzoyl)-2,4,4-trimethylpentylphosphine oxide, which is a first component (25 wt %) of Irgacure 1700 available from Ciba Additives, Tarrytown, N.Y. The second component (75 wt %) of Irgacure 1700 is 2-hydroxy-2-methyl-1-phenylpropane-1-one. 2-hydroxy-2-methyl-1-phenylpropane-1-one is also available as an individual photoinitiator named Darocur 1173. Further examples of free radical-type photoinitiators include: hydroxycyclohexylphenylketone; hydroxymethylphenylpropanone; dimethoxyphenylacetophenone; 2-methyl-1-[4-(methylthio)phenyl]-2-morpholino propan-1-one; 1-(4-isopropylphenyl)-2-hydroxy-2-methylpropan-1-one; 1-(4-dodecylphenyl)-2-hydroxy-2-methylpropan-1-one; 4-(2-hydroxyethoxy) phenyl-2(2-hydroxy-2-propyl)-ketone; diethoxyphenyl acetophenone; 2,4,6-trimethylbenzoyl diphenylphosphone; and mixtures of the foregoing.

A single reactive diluent or mixture of reactive diluents may be included in the radiation-curable composition. While not wishing to be bound by theory, it is theorized that, during the polymerization of the urethane acrylate oligomer, the reactive diluent(s) hooks together chains of the urethane acrylate oligomer. Adequate curing is promoted by the presence of the reactive diluent(s). The reactive diluent also functions as a solvent for the urethane acrylate oligomer. The use of the reactive diluent(s) allows the formulator to adjust the viscosity of the solution to improve processability.

The reactive diluent(s) may, for example, be a lower molecular weight, liquid acrylate-functional compound including the following diacrylates and monofunctional acrylates: tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetrathylene glycol dimethacrylate, 1,3-butylene glycol diacrylate, tetraethylene glycol diacrylate, triisopropylene glycol diacrylate, triisopropylene glycol diacrylate, ethoxylated bisphenol-A diacrylate, and isobornyl acrylate. Another example of a reactive diluent is n-vinyl caprolactam.

The radiation-curable composition may include an adhesion promoter. Examples of adhesion promoters include acid functional materials and organofunctional silanes. For example, the organofunctional silane may be an amino-functional silane, an acrylamido-functional silane, a mercapto-functional silane, an allyl-functional silane, a vinyl-functional silane, a methylacrylate-functional silane, and an acrylate-functional silane. The organofunctional silane may be mercaptoalkyl trialkoxyl silane, a methacryloyxlalkyl trialkoxy silane, an aminoalkyl trialkoxyl silane, a vinyl trialikoxyl silane, 3-aminopropyltriethoxy silane, 3-methacryloxypropyltrimethoxy silane, gamma-mercaptopropyltrimethoxy silane, gamma-mercaptopropyl (gamma-mercaptopropyl)triethoxy silane, beta-(3,4-epoxycyclohexyl) ethyltrimethoxy silane, gamma-glycidoxypropyltrimethoxy silane, 3-vinylthiopropyltrimethoxy silane, vinyl-tris-(beta-methoxyethoxy) silane, vinyl triacetoxy silane, and mixtures thereof. A particular adhesion promoter is KBM 803 available from Shin-Etsu Silicones of America, Inc, of Torrance, Calif.

The radiation-curable composition may also include each of the following well-known additives: antioxidants, flow control agents, sensitizers, stabilizers, lubricants and wetting agents.

In a preferred embodiment, however, the radiation-curable composition is free of release agents or surface agents. The reduced surface energy enjoyed by coatings produced from the present composition allow for the exclusion of release agents or surface agents. In addition, the present radiation-curable composition may be free of non-reactive diluents, such as water or organic solvents, which lack ethylenic unsaturation.

In preferred embodiments, the radiation-curable composition is used as a colored coating for a telecommunication element, such as an optical fiber or a telecommunication cable containing optical fibers.

Telecommunications cables containing optical fibers come in a variety of configurations. In some cables, the optical fibers are held loosely inside a buffer tube. In other cables, the optical fibers are arranged in a planar array to form an optical fiber ribbon. The planar array is typically encapsulated by one or more radiation-curable matrix material layers. The radiation-curable matrix layers are cured by exposing the matrix material to ultraviolet radiation, electron beam radiation, ionizing radiation or infrared radiation for a predetermined period of time deemed suitable for effective curing.

An optical fiber may comprise a core, a cladding and one or more polymeric coatings applied over the cladding. In particular, an optical fiber is usually coated with two superposed coatings, although it may be coated with three or more superposed coatings. The coating which contacts the glass is a relatively soft, primary coating that must satisfactorily adhere to the fiber and be soft enough to resist microbending, especially at low service temperatures. An outer, exposed coating may be a much harder secondary coating, and may provide resistance to handling forces, while possessing sufficient flexibility to enable the coated fiber to withstand repeated bending without cracking the coating.

Thus, the present composition may be tailored to serve as, e.g., a coating for an optical fiber ribbon, a primary or secondary coating for an optical fiber, or even as the tertiary coating for an optical fiber. In still other embodiments, the composition may be used as the lone coating on an optical fiber.

Because the reactive dye concentrates itself towards the surface of the coating, a reduced amount of dye is needed to color the fiber. For example, a radiation-curable composition according to the invention may employ from about 0.1 wt % to about 15 wt %, e.g., from about 1 wt % to about 12 wt %, of the present fluorinated, radiation-curable reactive dye, based on the total weight of the composition.

An additional advantage of an optical fiber coated with the present composition is that it spools easier.

The technique for coating an optical fiber with the present composition may involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness. Monitoring and measuring devices may be provided near each station to ensure that the coating applied at that station is coated concentrically and to the desired diameter. Examples of optical fiber coating techniques that may be utilized in the present invention include the methods disclosed in U.S. Pat. Nos. 4,512,281, 4,531,959, 4,539,219, 4,792,347, and 4,867,775.

Alternatively, the composition may be formulated to serve as a protective, colored coating for a wide variety of other substrates, including, for example, glass, plastic, ceramic, metal, wood, and textiles. For example, the composition may be employed as an ink, coating or colorant package in the printing and inking industries, when it is desired to replace traditional pigments with dye materials in a radiation-curable, e.g., uv-curable, vehicle. The amount of reactive dye according to the invention in coating, ink, or colorant package embodiments is not particularly limited, especially in view of the diverse applications in which the reactive dye may be employed. Indeed, while in some of these alternative applications, the reactive dye may be present in a composition in an amount of from about 0.1 wt % to about 15 wt %, in other applications the dye may make-up an even higher percentage of the composition, such as from 10–50 wt % of the radiation-curable composition, e.g., from about 15–35 wt % of the composition.

Other components of the ink, coating, or colorant package may include radiation-curable monomers and oligomers, or multifunctional radiation-curable materials, photoinitiator(s), stabilizer(s), surfactant(s), waxes, etc. in order to adjust viscosity and flow characteristics for the desired application.

The ink, coating, or colorant package may be applied to a substrate by a number of methods, including printing methods, such as gravure printing, ink jet printing, etc. The resulting ink, coating, or colorant package may have a number of unique properties, including a high surface energy finish and non-soiling properties. In short, the composition may provide an alternative to traditional methods for providing a non-soiling surface, such as a method that provides an overcoat of polyvinylidene fluoride (PVDF).

While the invention has been described in detail and with reference to specific embodiments thereof, it will be apparent to those of ordinary skill in the art that various changes and modifications can be made therein without departing from the spirit and scope thereof.

What is claimed is:

1. A telecommunication element coated with a radiation-curable composition, comprising a reactive dye comprising at least one radiation-curable substituent and at least one fluorine-containing substituent.

2. The telecommunication element of claim 1, wherein the telecommunication element is selected from the group consisting of (i) an optical fiber having a core and a cladding surrounding the core, (ii) an optical fiber having a core, a cladding surrounding the core, and one or more polymeric coatings on the cladding, and (iii) an optical fiber ribbon.

3. The telecommunication element of claim 1, wherein the dye is a derivative of an anthraquinone dye, a methine dye, an azo dye, an azine dye, or a xanthene dye, and the dye comprises at least one radiation-curable substituent and at least one fluorine-containing substituent.

4. The telecommunication element of claim 1, wherein at least one radiation-curable substituent is selected from the group of substituents consisting of (meth)acrylate, styrene, vinyl ether, vinyl ester, N-substituted acrylamide, N-vinyl amide, maleate ester, and fumarate ester.

5. The telecommunication element of claim 1, wherein the radiation-curable composition further comprises one or more of a (meth)acrylate urethane oligomer, a photoinitiator, and one or more process additives selected from the group consisting of adhesion promoter, antioxidant, flow control agent, sensitizer, stabilizer, lubricant, and wetting agent.

6. The telecommunication element of claim 1, wherein the radiation-curable composition comprises from about 0.1 wt % to about 15 wt % of the reactive dye.

* * * * *